(12) United States Patent
Orlicki et al.

(10) Patent No.: US 7,403,232 B1
(45) Date of Patent: Jul. 22, 2008

(54) INTELLIGENT POWER MANAGEMENT SYSTEM

(75) Inventors: David M. Orlicki, Rochester, NY (US); James H. Ford, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1077 days.

(21) Appl. No.: 09/654,745

(22) Filed: Sep. 1, 2000

(51) Int. Cl.
*H04N 5/225* (2006.01)
*G06F 1/00* (2006.01)
*G06F 1/26* (2006.01)
*G06F 1/32* (2006.01)
*G06F 13/00* (2006.01)

(52) U.S. Cl. .................. 348/372; 713/310; 713/320; 710/303

(58) Field of Classification Search ............ 348/372, 348/207.7, 207.11, 374–376; 710/303–304; 361/682; 320/114; 713/300, 310, 320
See application file for complete search history.

(56) References Cited

U.S. PATENT DOCUMENTS

| | | | |
|---|---|---|---|
| 4,928,137 A * | 5/1990 | Kinoshita | 348/297 |
| 5,132,800 A * | 7/1992 | Wada et al. | 348/375 |
| 5,189,520 A * | 2/1993 | Okayasu et al. | 348/376 |
| 5,198,851 A | 3/1993 | Ogawa | |
| 5,392,447 A | 2/1995 | Schlack et al. | |
| 5,477,511 A | 12/1995 | Englehardt | |
| 5,708,853 A | 1/1998 | Sanemitsu | |
| 5,719,936 A | 2/1998 | Hillenmayer | |
| 5,784,105 A * | 7/1998 | Kawamura | 348/372 |
| 5,801,919 A | 9/1998 | Griencewic | |
| 5,808,672 A | 9/1998 | Wakabayashi et al. | |
| 5,826,043 A * | 10/1998 | Smith et al. | 710/303 |
| 5,867,218 A | 2/1999 | Matsuzaki et al. | |
| 5,898,600 A | 4/1999 | Isashi | |
| 6,101,339 A * | 8/2000 | Miki et al. | 396/301 |
| 6,191,814 B1 * | 2/2001 | Elberbaum | 348/211.14 |
| D449,848 S * | 10/2001 | Lewis et al. | D16/242 |
| 6,580,460 B1 * | 6/2003 | Takahashi et al. | 348/372 |
| 6,597,389 B2 * | 7/2003 | Tanaka et al. | 348/14.08 |
| 6,661,462 B2 * | 12/2003 | Ohnogi | 348/372 |
| 6,933,981 B1 * | 8/2005 | Kishida et al. | 348/375 |

* cited by examiner

*Primary Examiner*—James M. Hannett
*Assistant Examiner*—Kelly L Jerabek
(74) *Attorney, Agent, or Firm*—Thomas J. Strouse (57) ABSTRACT

An intelligent power management system is particularly applicable to accessory devices that can be coupled to a basic device to provide the basic device with an enhanced feature. The accessory device includes a control processor and a power supply unit, wherein the power supply unit supplies electrical energy to the control processor in response to a control signal received from the basic device. The power supply unit includes a power management circuit that maintains the electrical energy supplied to the control processor during fluctuations of the control signal.

24 Claims, 6 Drawing Sheets

FIG. 6

INTELLIGENT POWER MANAGEMENT SYSTEM

FIELD OF THE INVENTION

The invention relates in general to power management systems. More specifically, the invention relates to a power management system that is particularly applicable to an accessory device that can be coupled to a basic device such as a personal digital assistant device.

BACKGROUND OF THE INVENTION

Personal digital assistant devices, commonly referred to as PDA's, have recently become popular for use in organizing schedules and personal information. In order to expand the capability of such devices, various additional features have been proposed for use with the PDA's including, for example, communication devices and digital cameras. While these additional features can be incorporated into the structure of the PDA itself, it is generally preferable to provide accessory devices that can be coupled to a basic PDA via a standard interface to perform the additional functions on an as needed basis.

One problem associated with the use of such accessory devices, however, is the mismatch between the power requirements of the basic PDA and the power requirements for the additional features. The basic PDA is required to have a low power drain requirement in order to extend the useful life of its batteries. Devices such as digital cameras, however, usually consume power at a much higher rate than basic PDA's and other small consumer electronic devices. In order to prevent unnecessary draining of the batteries of the basic PDA device, it is therefore preferable to provide the accessory device with its own batteries.

Even with its own power source, however, the power requirements of the accessory device might be unnecessarily drained if the accessory device begins to draw power or is turned on as soon as it is attached to the basic PDA. It would therefore be preferable to provide a mechanism for managing the power requirements of the accessory device to conserve available battery power.

In view of the above, it is an object of the present invention to provide an accessory device for a personal digital assistant that includes intelligent power management that prevents undue draining of battery power.

SUMMARY OF THE INVENTION

The invention provides an intelligent power management system for use in electronic devices. The invention is applicable to accessory devices that can be coupled to a basic device to provide the basic device with an enhanced feature. In a preferred example, the basic device includes a docking interface and the accessory device couples to the docking interface of the basic device. The accessory device includes a control processor and a power supply unit, wherein the power supply unit supplies electrical energy to the control processor in response to a control signal received from the basic device. The power supply unit maintains the electrical energy supplied to the control processor during fluctuations of the control signal with a power management circuit.

The power supply unit preferably includes a power management circuit, which receives the control signal from the basic device and a further control signal from the control processor, and a power supply. The power management circuit preferably includes a first switching element that is responsive to the control signal and the further control signal to generate a power activation signal, and a second switching element that is responsive to the power activation signal. The second switching element couples a battery of the accessory device to the power supply in response to the power activation signal.

The first switching element is implemented through the use of a bipolar transistor and the second switching element is implemented through the use of a field effect transistor, although other circuit elements may be utilized to perform the same basic function.

Alternatively, the power management circuit utilizes a capacitor and resistor network to latch an input of the power supply to a logic level that enables operation.

The invention is particularly applicable for implementation in an accessory device that attaches to a personal digital assistant device such as a digital camera, although the invention may also be employed in other types of accessory devices and basic devices.

BRIEF DESCRIPTION OF THE DRAWINGS

The invention will be described with reference to certain preferred embodiments thereof as illustrated in the accompanying drawings, wherein.

DETAILED DESCRIPTION OF THE PREFERRED EMBODIMENTS

Figure 1:
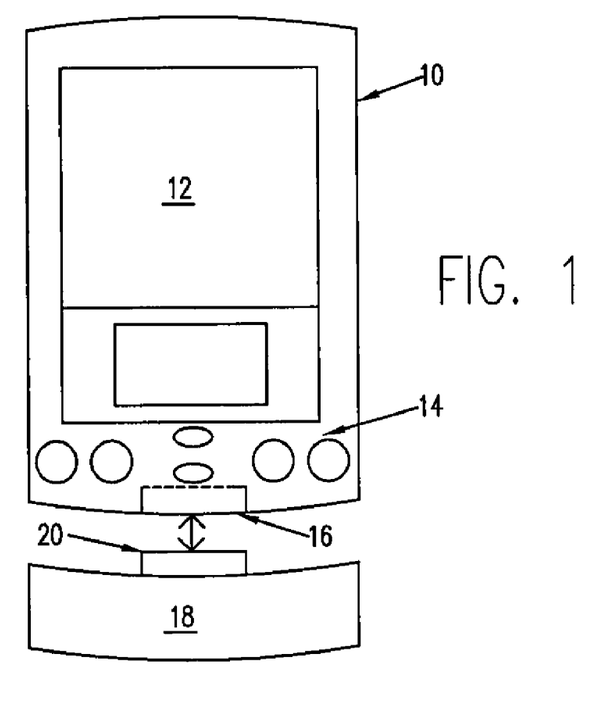
FIG. 1 illustrates a basic personal digital assistant device and digital camera.
Figure 2:
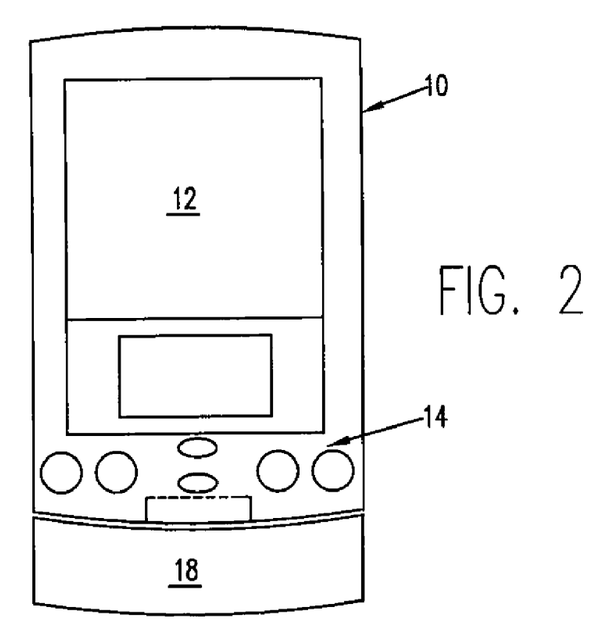
FIG. 2 illustrates the digital camera coupled to the basic personal digital assistant device.

FIG. 1 illustrates a PDA 10 that includes a display screen 12, various user controls 14 and a docking interface 16. The docking interface 16 is used to couple the PDA 10 to various accessory devices including, as just one example, a digital camera 18 that is supplied with a corresponding mating interface 20. FIG. 2 illustrates the digital camera 18 coupled to the PDA 10. For the purposes of this discussion, it will be understood that the terms "docking interface" and "mating interface" include mechanical and/or electrical components required to mate the digital camera 18 to the PDA 10 and allow the transfer of control and data signals therebetween. It is preferable to utilize a standard communication protocol (for example IEEE RS232) to implement the docking interface 16 and the mating interface 20, although any other standard or custom communication protocol may also be employed.

In the illustrated embodiment, the PDA 10 is provided with an imaging application program that utilizes the display screen 12 of the PDA 10 as a viewfinder for the digital camera 18. In addition, the imaging application program interprets signals received from the user controls 14 as commands to operate the digital camera 18. As a result, the digital camera 18 need only be provided with appropriate optics and image capture circuitry, thereby avoiding the necessity of providing duplicate components. Images captured by the digital camera 18 can be stored and downloaded to other devices, such as a personal computer, via the PDA 10.

Figure 3:
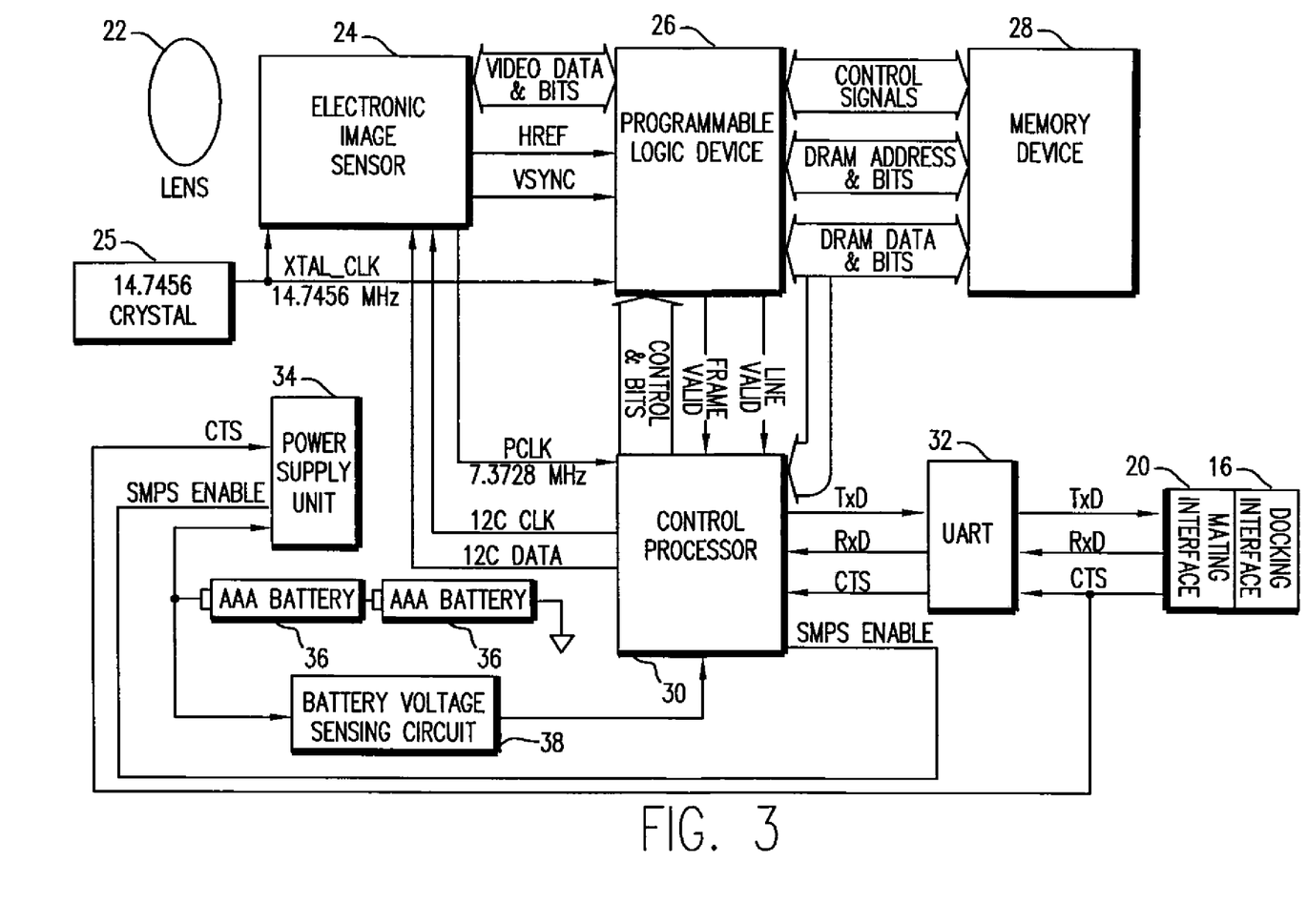
FIG. 3 is a block diagram of the digital camera illustrated in FIG. 2.

A detailed schematic block diagram of the digital camera 18 is illustrated in FIG. 3. As shown in FIG. 3, the digital camera 18 includes a lens system 22 that focuses scene light onto an electronic image sensor 24. Image data generated by the electronic image sensor 24 is supplied to a programmable logic device 26, which controls the management and storage of the image data in a memory device 28 in response to control signals supplied by a control processor 30. A crystal 25 provides a stable reference frequency which is used to generate clock signals in the image sensor 24 and the programmable logic device 26. The control processor 30 is coupled to a UART 32, which in turn is coupled to the mating interface 20. Power is supplied to the various components by a power supply unit 34 that is coupled to ordinary AAA batteries 36. Alternatively, an integrated rechargeable battery may be employed. A battery voltage sensing circuit 38 is preferably provided to monitor the charge condition of the batteries 36 and provide the status thereof to the control processor 30.

Figure 4:
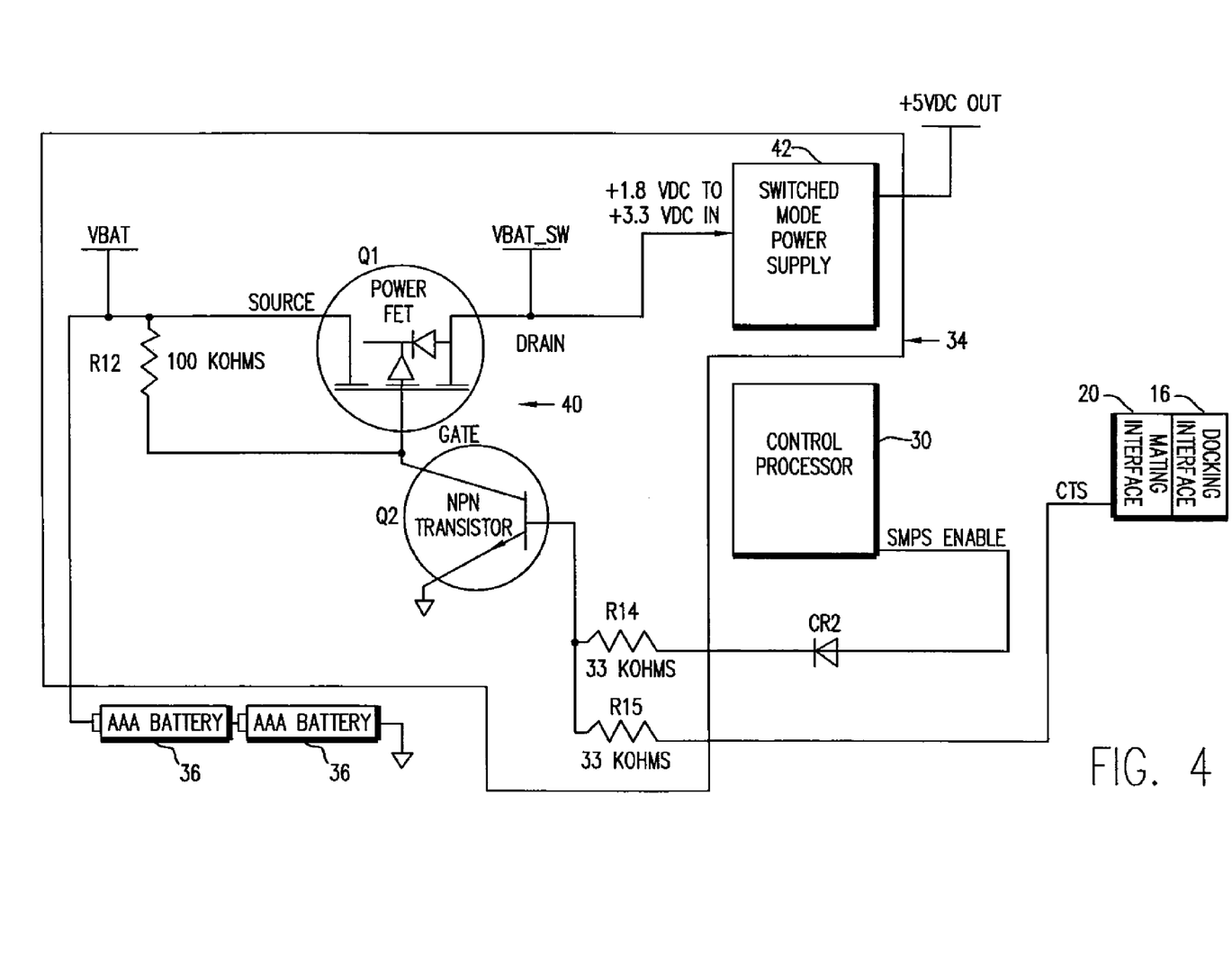
FIG. 4 is a schematic diagram of a power unit incorporated into the digital camera illustrated in FIG. 3.

The power supply unit 34 is illustrated in greater detail in FIG. 4 as including a power management circuit 40 and a conventional switched mode power supply (SMPS) 42, although other types of power supplies or regulation circuitry could be utilized based on the particular application of interest. The power management circuit 40 includes an NPN transistor Q2 having its base coupled to a first control signal line, which in the illustrated example is a switched mode power supply enable line (SMPS ENABLE), and to a second control signal line, which in the illustrated example is a CLEAR-TO-SEND control line (CTS) received from the PDA 10 via the docking interface 16 and mating interface 20, both of which can be utilized to control the operation of the NPN transistor Q2. The NPN transistor Q2, in turn, is used to control the gate of the power FET Q1 by supplying a power activation signal thereto.

Figures 5, 5A:
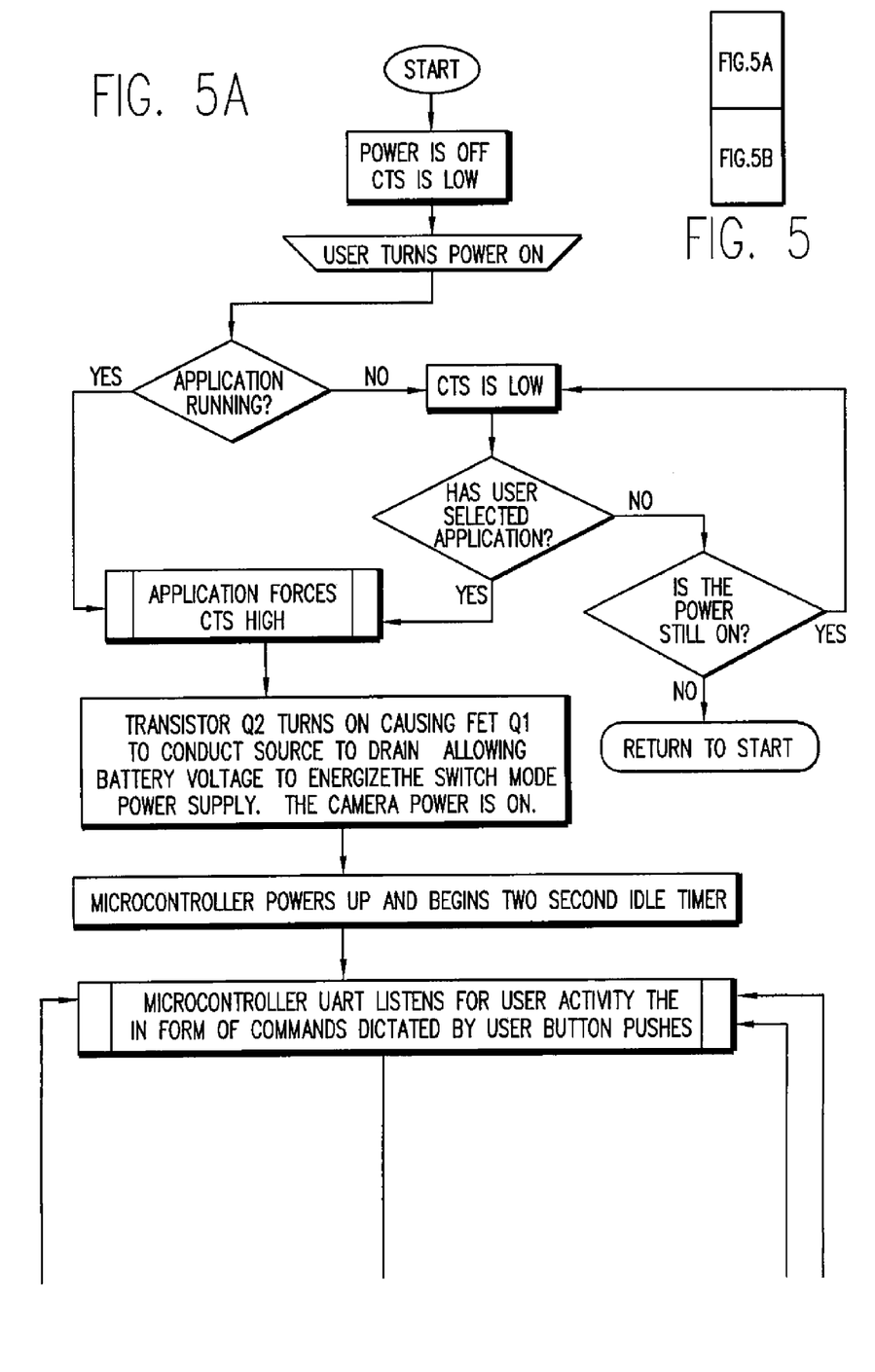
FIG. 5 is an operational flow diagram illustrating the operation of the power unit illustrated in FIG. 4.
Figure 5B:
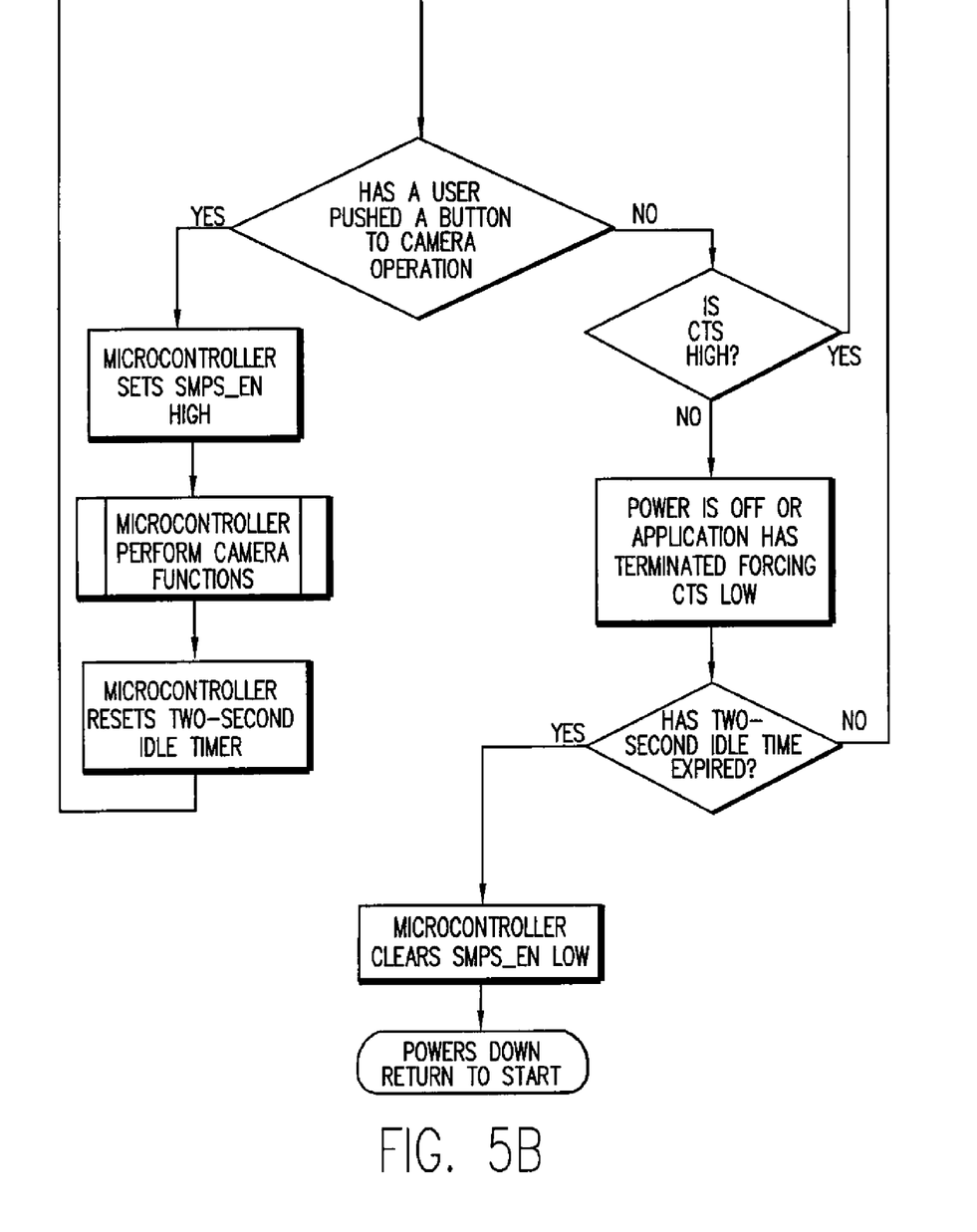

A detailed description of the operation of the power management circuit 40 will now be described with reference to FIG. 5. As shown in FIG. 5, the CTS control line is low when the PDA 10 is off. When a user turns the PDA 10 on, a decision is made as to whether an imaging application is running on the PDA 10. If an imaging operation is running on the PDA 10, the CTS control line is held high, which causes transistor Q2 to turn on. The activation of transistor Q2 then causes transistor Q1 to conduct. As a result, the SMPS 42 is energized from the power supplied from the batteries 36 and the regulated operating voltage for the digital camera 18 is activated.

Activation of the power for the digital camera 18 causes the control processor 30 to power up. After the initial power up, the control processor 30 enters a two second idle timer routine. During the idle timer routine, the UART 32 waits to receive command signals from the PDA 10 via the mating interface 20. If a command signal is received relating to an imaging function, the control processor 30 sets the SMPS ENABLE line high which forces the SMPS 42 to stay on. An imaging operation is then performed under the control of the control processor 30.

After completion of the imaging operation, the control processor returns to the two second idle timer routine. If no user command is detected and the CTS line remains high, the UART 32 continues to wait for receipt of a command signal. If the CTS line is not high, however, it indicates that the PDA 10 has been powered off or the imaging application has been terminated. In such a circumstance, if the idle timer routine being performed by the control processor 30 has also expired, the control processor 30 clears the SMPS ENABLE line and the power for the digital camera 18 is deactivated.

The power management circuit 40 insures that the power to the digital camera 18 is activated if the digital camera 18 is attached to the PDA 10 and an imaging application is running. The use of the SMPS ENABLE signal to clamp Q2 in an on state avoids problems associated with the instability of the CTS signal supplied from the PDA 10. For example, the CTS signal may toggle at each activation of the user controls 14. Thus, the CTS signal is high once the PDA 10 enters the imaging application, but when the user activates the user controls 14 to capture an image, the CTS signal may drop low causing the digital camera 18 to inadvertently power down. The SMPS ENABLE signal, however, clamps Q2 for the duration of the actual imaging operation, thereby avoiding inadvertent power down due to fluctuations or toggling of the CTS signal.

Figure 6:
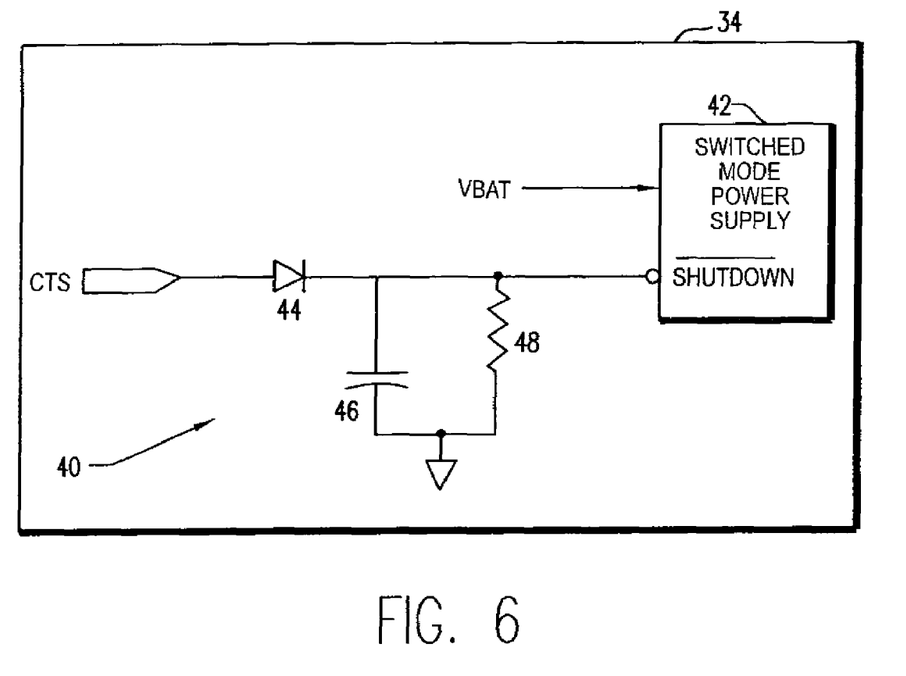
FIG. 6 is a schematic block diagram of a power supply unit in accordance with a second embodiment of the invention.

FIG. 6 illustrates an alternative embodiment that operates independently from the control processor 30 in which the SMPS ENABLE does not have to be supplied by the control processor 30. In the embodiment illustrated in FIG. 6, the power management circuit 40 of the power supply unit 34 includes a diode 44, capacitor 46 and a resistor 48 that are coupled to the CTS line and a shutdown input (SHUTDOWN) of the switched mode power supply 42. As in the previous embodiment, the CTS line goes to a logic high when an imaging operation is running on the PDA 10, thereby charging the capacitor 46 and pulling the SHUTDOWN input to a logic high to enable operation of the switched mode power supply 42. If the signal on the CTS line should momentarily drop low during operation, the diode 44 becomes back biased forcing the capacitor 46 to discharge through the resistor 48. The values of the capacitor 46 and resistor 48 are selected to provide a time constant sufficient to hold a logic high state on the SHUTDOWN input to bridge momentary dropouts of the signal supplied to the CTS line. When the CTS line returns to a logic high, the capacitor 46 is charged in preparation for the next dropout. Once the imaging application is terminated or the PDA 10 is turned off, the signal supplied to the CTS line goes low and the capacitor 46 eventually discharges causing the switched mode power supply 42 to deactivate.

The invention has been described with reference to certain preferred embodiments thereof. If will be understood, however, that modifications and variations are possible within the scope of the appended claims. For example, the type of transistors or switching elements employed within the power management circuit may be readily varied based on intended application. Further, the invention is not limited to the use of a CTS signal, but is applicable to any power management application in which an initial power on signal is subject to instability. Still further, although a preferred embodiment of the invention was illustrated using a digital camera, the invention is applicable to any type of accessory device that is coupled to a basic PDA or to any other types of combinations of accessory devices and base components.

PARTS LIST

10 Personal Digital Assistant (PDA)
12 Display Screen
14 User Controls
16 Docking Interface
18 Digital Camera
20 Mating Interface
22 Lens System
24 Electronic Image Sensor 25 Crystal
26 Programmable Logic Device
28 Memory
30 Control Processor
32 UART
34 Power Supply Unit
36 Batteries
38 Voltage Sensing Circuit
40 Power Management Circuit
42 Switched Mode Power Supply
44 Diode
46 Capacitor
48 Resistor

What is claimed is:

1. An apparatus comprising:
a basic device including a docking interface; and
an accessory device, including a control processor and a power supply unit, that couples to the docking interface of the basic device;
wherein the power supply unit supplies electrical energy to the control processor in response to a control signal received from the basic device;
wherein the control signal provides an indication from the basic device to the accessory device that the accessory device is to be powered on using a power source internal to the accessory device;
wherein the control signal triggers a transition of the accessory device from a powered-off state in which the power supply unit is deactivated and the control processor is powered off to a powered-on state in which the power supply unit is activated and the control processor is powered on, the control signal being indicative of whether or not an application which requires use of the accessory device is currently running on the basic device.

2. An apparatus as claimed in claim 1, wherein the power supply unit maintains the electrical energy supplied to the control processor in response to a further control signal received from the control processor.

3. An apparatus as claimed in claim 2, wherein the power supply unit includes a power management circuit that receives the control signal from the basic device and the further control signal from the control processor, and a power supply that supplies the electrical energy to the control processor.

4. An apparatus as claimed in claim 3, wherein the power management circuit includes a first switching element that is responsive to the control signal and the further control signal to generate a power activation signal, and a second switching element that is responsive to the power activation signal.

5. An apparatus as claimed in claim 4, wherein the accessory device further includes at least one battery, and the second switching element couples the battery to the power supply in response to the power activation signal.

6. An apparatus as claimed in claim 4, wherein the first switching element comprises a bipolar transistor and the second switching element comprises a field effect transistor.

7. An apparatus as claimed in claim 3, wherein the power supply comprises a switched mode power supply.

8. An apparatus as claimed in claim 1, wherein the basic device comprises a personal digital assistant device.

9. An apparatus as claimed in claim 8, wherein the accessory device comprises a digital camera.

10. An apparatus as claimed in claim 9, wherein the control processor controls the operation of the digital camera to capture image data in response to a control signal received from the basic device.

11. An apparatus as claimed in claim 9, wherein the personal digital assistant includes a display device, and wherein image data captured by the digital camera is displayed on the display device of the personal digital assistant.

12. An apparatus as claimed in claim 1, wherein the power supply unit includes a power management circuit comprising a capacitor and resistor network that receives the control signal from the basic device, the capacitor and resistor network comprising at least one capacitor and at least one resistor, and a power supply coupled to the power management circuit, and wherein said capacitor and resistor network maintains an input of the power supply at a logic level required to maintain the electrical energy when the control signal fluctuates.

13. A digital camera accessory device comprising:
a lens system;
a docking interface;
image processing circuitry that captures image data;
a control processor that controls the operation of the image processing circuitry to perform an image capture operation; and
a power supply unit that supplies electrical energy to the image processing circuitry and the control processor;
wherein the power supply unit supplies the electrical energy to the control processor in response to a control signal received from the docking interface;
wherein the control signal provides an indication to the accessory device that the accessory device is to be powered on using a power source internal to the accessory device; and
wherein the control signal triggers the digital camera accessory device to transition from a powered-off state in which the power supply unit is deactivated and the control processor is powered off to a powered-on state in which the power supply unit is activated and the control processor is powered on.

14. A digital camera as claimed in claim 13, wherein the power supply unit maintains the electrical energy supplied to the control processor in response to a further control signal received from the control processor.

15. A digital camera as claimed in claim 14, wherein the power supply unit includes a power management circuit that receives the control signal and the further control signal and a power supply that supplies the electrical energy to the control processor.

16. A digital camera as claimed in claim 15, wherein the power management circuit includes a first switching element that is responsive to at least one of the control signal and the further control signal to generate a power activation signal, and a second switching element that is responsive to the power activation signal.

17. A digital camera as claimed in claim 16, wherein the digital camera further includes at least one battery, and the second switching element couples the battery to the power supply in response to the power activation signal.

18. A digital camera as claimed in claim 16, wherein the first switching element comprises a bipolar transistor and the second switching element comprises a field effect transistor.

19. A digital camera as claimed in claim 15, wherein the power supply comprises a switched mode power supply.

20. An apparatus as claimed in claim 13, wherein the power supply unit includes a power management circuit comprising a capacitor and resistor network that receives the control signal from the docking interface, the capacitor and resistor network comprising at least one capacitor and at least one resistor, and a power supply coupled to the power management circuit, and wherein said capacitor and resistor network maintains an input of the power supply at a logic level required to maintain the electrical energy when the control signal fluctuates.

21. A method of managing the power requirements of an accessory device coupled to a basic device comprising:

generating a first control signal with the basic device and supplying the first control signal to the accessory device;

the first control signal providing an indication from the basic device to the accessory device that the accessory device is to be powered on using a power source internal to the accessory device;

activating a power supply unit of the accessory device in response to the first control signal to supply electrical power from the power supply unit to a control processor of the accessory device;

generating a second control signal with the control processor of the accessory device and supplying the second control signal to the power supply unit; and latching operation of the power supply unit in response to the second control signal to maintain the supply of electrical power from the power supply unit to the control processor regardless of the state of the first control signal;

wherein the first control signal triggers a transition of the accessory device from a powered-off state in which the power supply unit is deactivated and the control processor is powered off to a powered-on state in which the power supply unit is activated and the control processor is powered on.

22. A method as claimed in claim 21, further comprising maintaining the latching of the operation of the power supply unit for a predetermined time period.

23. A method as claimed in claim 22, further comprising discontinuing the latching of the operation of the power supply unit after expiration of the predetermined time period in response to the state of the first control signal.

24. A method as claimed in claim 23, further comprising performing an accessory operation with the accessory device in response to an activity command signal and resetting the predetermined time period after completion of the accessory operation.

* * * * *